US011962375B2

(12) United States Patent
Li

(10) Patent No.: US 11,962,375 B2
(45) Date of Patent: Apr. 16, 2024

(54) GEOLOCATION-BASED BEAMFORMING FOR DRONE COMMUNICATION

(71) Applicant: Yan Li, San Jose, CA (US)

(72) Inventor: Yan Li, San Jose, CA (US)

(73) Assignee: TaiSync Technology, Inc., San Jose, CA (US)

( * ) Notice: Subject to any disclaimer, the term of this patent is extended or adjusted under 35 U.S.C. 154(b) by 0 days.

(21) Appl. No.: 16/416,642

(22) Filed: May 20, 2019

(65) Prior Publication Data

US 2019/0363769 A1 Nov. 28, 2019

Related U.S. Application Data

(60) Provisional application No. 62/675,600, filed on May 23, 2018.

(51) Int. Cl.
*H04B 7/06* (2006.01)
*B64C 39/02* (2023.01)
*G01S 19/45* (2010.01)

(52) U.S. Cl.
CPC ......... *H04B 7/0617* (2013.01); *B64C 39/024* (2013.01); *G01S 19/45* (2013.01)

(58) Field of Classification Search
CPC ...... H04B 7/0617; B64C 39/024; G01S 19/45
See application file for complete search history.

(56) References Cited

U.S. PATENT DOCUMENTS

| 8,213,957 B2* | 7/2012 | Bull ......................... G01S 5/02 370/328 |
| 2017/0235316 A1* | 8/2017 | Shattil ............... H04B 7/18504 701/3 |
| 2017/0350959 A1* | 12/2017 | Yaqub ...................... G01S 5/06 |

* cited by examiner

*Primary Examiner* — Duc C Ho
(74) *Attorney, Agent, or Firm* — Perkins Coie LLP

(57) ABSTRACT

System and method of wireless communication in UAV systems that uses geolocation-based beamforming. The antenna array on the transmit device is first calibrated to compensate the random phase errors of the antenna. During operation, the geolocations of the UAV and its remote control and the rotational position of the transmit device are used to determine a beamforming direction. A beamforming vector is selected based on the beamforming direction. The beamformer on the transmit device then beam forms the antenna array such that data or other information can be transmitted to the receive device in the beamforming direction.

20 Claims, 6 Drawing Sheets

GEOLOCATION-BASED BEAMFORMING FOR DRONE COMMUNICATION

CROSSREFERENCE TO RELATED APPLICATION

This application claims benefit and priority of U.S. Provisional Patent Application No. 62/675,600, filed on May 23, 2018, entitled "Schemes on Geographic Information Based Beam-forming," the entire content of which is incorporated herein by reference for all purposes.

TECHNICAL FIELD

The present disclosure relates generally to the field of wireless communication in unmanned aerial vehicles (UAVs), more specifically, to the field of beamforming mechanisms used in UAV wireless communications.

BACKGROUND OF THE INVENTION

Unmanned aerial vehicles (UAVs), commonly referred to as unmanned aircrafts or "drones," are aircrafts that fly without a human pilot onboard. Some UAVs can be controlled, operated or piloted in real time by a human operator via a ground-based control system, e.g., a remote control console. Some UAVs can be supervised, but is not piloted, in real time by a human operator via a ground-based monitoring system. There are still some UAVs capable of autonomous control in flight and including navigational instrumentation and control circuitry that permit the UAV to navigate in real time without the aid of a human operator.

Regardless of the extent of human operator control that is needed to fly an UAV, it is desirable that the UAV can communicate with its ground based control system in real time. For example, video images from an onboard camera can be transmitted from the UAV to a receive device with a personal video display (e.g., a remote control console or a smart phone) on the ground via a wireless communication channel.

Control messages, video data or other information, are typically transmitted by using the beamforming mechanism. Beamforming is a technique that enables directional transmission or reception using multiple antennas or positional sensors. Directional transmission can enhance power of received signals and therefore offer high signal-to-noise ratios. Transmit beamforming achieves directional transmission by adjusting the phases and/or amplitudes of signals transmitted via multiple antennas. Receive beamforming can achieve directional reception by adjusting the phases and/or amplitudes of signals received via multiple antennas.

For real time wireless communications between an UAV device and its remote control device, existing beamforming schemes rely on channel characterization to improve transmission performance. In some systems that use WIFI communication, one device can characterize the channel by channel sounding and channel feedbacks. In some systems that use LTE communication, beamforming transmission is based on beambook training (or sector training) or beambook index feedback (or sector index feedback), where the transmit device sends training signals in different beam sectors to the receive device to identify an optimum beamforming vector. Similarly, receive beamforming generally relies on the estimated channels or pre-trained sectors from the received training signals. The training signals can be inserted either in a preamble or in the payload of a packet.

With regards to wireless communication between a UAV and its remote control station (STA), using transmit beamforming based on channel characterization faces several challenges. During operation, the UAV usually changes its positions and geolocations very frequently, and so the communication channel with the remote control system change rapidly, e.g., from packet to packet. Therefore, the feedback of channels or sectors on previous packets, and the associated channel characterization results (for example obtained by channel sounding and channel feedback, or beambook (sector) training, become obsolete quickly. One possible effort to remedy this problem is to perform frequent channel sounding or beambook training to obtain characterization of the fast-changing channel. However, frequent channel feedback and beambook training add significant overhead communications, which causes reduced spectrum efficiency and throughput of data transmission. Further, channel sounding and beambook training both need specifically designed protocols, which can undesirably lead to increased design complexity and manufacturing cost.

Similarly, at the receive device, receive beamforming based on pre-trained sectors poses difficulty in channel estimation due to the fast variation in the channel. Receive beamforming based on channel estimation using inserted training signals cannot be used to enhance the performance of packet detection and synchronization because, in these stages, channel estimation is not available yet. For packet-based communication, if the receive beamforming cannot be applied to the pre-channel estimation portion, the benefit of receive beamforming is limited because the link budget is limited by the pre-channel estimation portion.

SUMMARY OF THE INVENTION

Embodiments of the present disclosure provide a mechanism of wireless communication between a UAV and a remote control station that offers high efficiency and accuracy in data transmission despite the rapidly time-variant channel for the communication.

Embodiments of the present disclosure include determining a beamforming direction based on the geolocations of both a UAV and the communicating remote control STA, and additionally based on the current rotational position of the antenna array of the transmit device. Either the UAV or the remote control STA can be the transmit device when it transmits information. In some embodiments, the transmit device is equipped with an antenna array which remains in a fixed position in relation to the body frame of the transmit device when the device is rotating or otherwise moving. The transmit device first performs a beambook (or sector) calibration to compensate for the random phase errors. The calibration ensures that, during operation, beambook can accurately provide an intended beamforming direction. This may be performed each time the transmit device is powered on when the UAV is not moving. When the UAV is in motion and communicating with the remote control STA, the transmit device determines a beamforming direction by utilizing its own geolocation information (e.g., the first GPS information), its rotational position information (e.g., pitch, roll and yaw values) and the receive device's geolocation (e.g., the second GPS information). The transmit device then selects a beamforming vector corresponding to the determined beamforming direction to transmit a message to the receive device. For example, the message may be video data that the UAV captured and transmitted during flight, or control information that the remote control STA transmits to the UAV.

According to embodiments of the present disclosure, a beamforming direction is determined based on the geolocation information and the rotational position information, which can be generated by the components contained in the transmit device, e.g., a built-in GPS receiver and rotational sensors. This eliminates the need for channel characterization by using beambook training or receiver training signals as in the conventional approach. Further, the geolocation information and the rotational information are unaffected by the channel conditions and can be updated to the transmit device quickly in real time with UAV motions. Comparing to the conventional approach that uses channel sounding and channel feedback, geolocation-based beamforming offers significantly reduced time and enhanced transmission or reception performance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
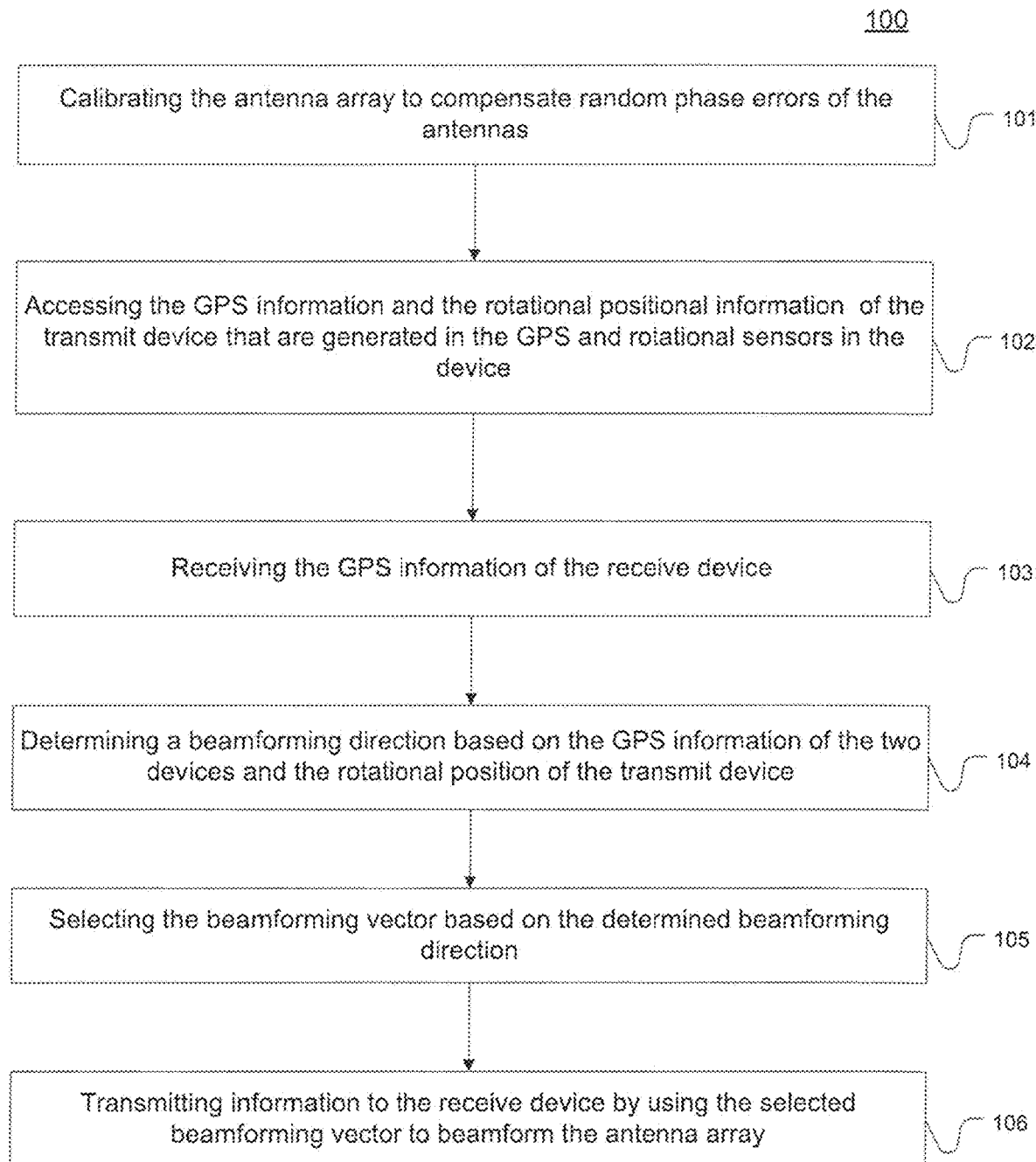
FIG. 1 is a flow chart depicting an exemplary process of transmitting information in a UAV-remote control system by using geolocation-based beamforming in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Embodiments of the present disclosure provide a system and method of wireless communication in UAV systems. During operation, the geolocations of the UAV and its remote control STA (e.g., ground-based control console) and the rotational position of the transmit device are used to determine a beamforming direction. The beamformer on the transmit device then beamforms the antenna array such that data or other information can be transmitted to the receive device in the beamforming direction.

FIG. 1 is a flow chart depicting an exemplary process 100 of transmitting information in a UAV-remote control system by using geolocation-based beamforming in accordance with an embodiment of the present disclosure. Process 100 may be performed by the transmit device, e.g., either the UAV or the remote control STA. At 101, the transmit device performs beamforming calibration on its antenna array to detect random phase errors and accordingly compensate. The random phase errors may be ascribed to a range of factors, such as coupling, hardware aging, clock drifting, and environmental effects. These random errors may adversely impact the beamforming performance of the system. The calibration may be performed each time the transmit device is powered on, for example. The present disclosure is not limited to any specific process, mechanism, algorithm or technique used for antenna calibration. The calibration ensures that the random phase errors are properly compensated for such that each beambook (or a combination of the phases and beam direction of the antennas in the array as determined through beamforming) can accurately aim in the intended beam direction during transmission.

In the embodiments described in detail herein, the antennas in the array can be arranged in one dimension or two dimensions and have fixed locations and positions in relation to the body frame of the transmit device. Thus, the antennas remain stationary relative to the transmit device irrespective of motions of the transmit device, e.g., remote control motions caused by the operator or the UAV motions in the air. Further the antennas are omni-antennas suitable for non-Line-Of-Sight (NLOS) MU-MIMO communication. However, it will be appreciated that any type of antennas can be used in geolocation based beamforming without departing from the scope of the present disclosure.

At 102, the geolocation (e.g., GPS satellite information) and the rotational positional information of the transmit device are accessed. For example, both the remote control STA and the UAV have a built-in GPS receiver and a set of rotational sensors. In some embodiments, the GPS satellite information is provided by the GPS receiver built in the transmit device. In some other embodiments, the geolocation information is provided by a third station and without using the communication channel between the UAV and the remote control STA, thus eliminating the need for training and characterization of the channel between the UAV and the remote control STA.

The rotational positional information, including position and orientation that are relevant to beamforming directionality, can be provided by a set of rotational sensors built-in the transmit device, such as accelerometers, gyrometers, a tilt sensor and the like. In some embodiments, a rotational position may be defined by one or more of a roll angle, a yaw angle, and a tilt angle. However, any other suitable coordinate system and values may be used to characterize a rotational position of the transmit device.

At 103, the transmit device receives the geolocation information of the receive device. Similarly, this geolocation is provided by the GPS receiver carried in the receive device or a third station and without using the communication channel between the UAV and the remote control STA.

At 104, a beamforming direction is determined based on the geolocations of the transmit device and the receive device, and the rotational position of the transmit device. More specifically, a spatial direction between the transmit device and the receive device is determined based on their current geolocations. The spatial direction the combines with the rotational position of the transmit device, particularly the rotational position of the antenna array, to determine the beamforming direction, as described in greater detail with reference to FIGS. 2~5.

At 105, given the determined beamforming direction, a beamforming vector is selected which specifies respective phases and/or beam directions of the antennas in the array to achieve the beamforming direction. At 106, the beamformer sets the phases and amplitudes for the antennas according to the beamforming vector, and transmit a message to the receive device through the antenna array. The message may be video data captured by the UAV during flight, a control command or instruction transmitted from the remote control STA to the UAV, or any other type of information.

Figure 2:
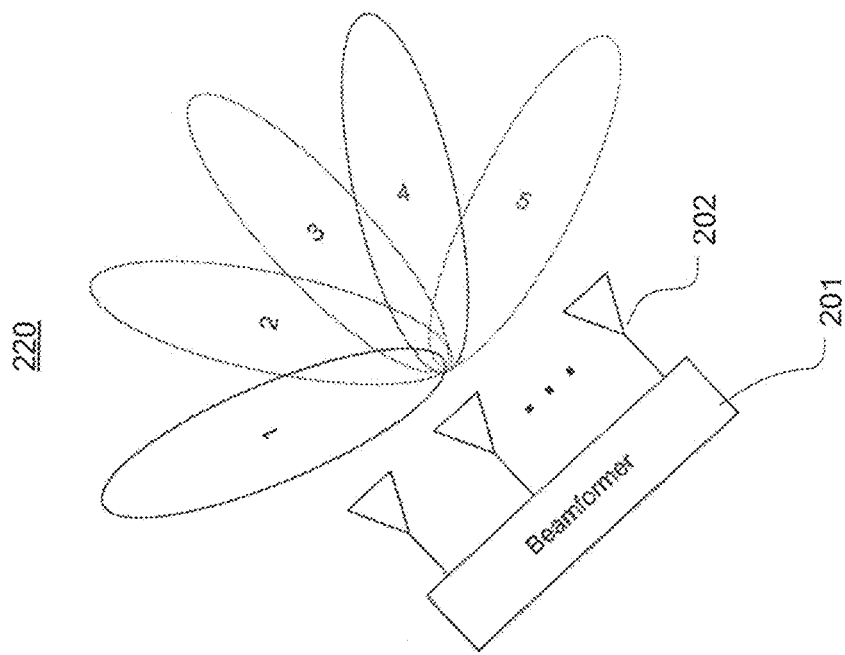
FIG. 2 illustrates the change in beamforming direction as a result of rotation of the antenna array in an exemplary transmit device in accordance with an embodiment of the present disclosure.
Figure 2:
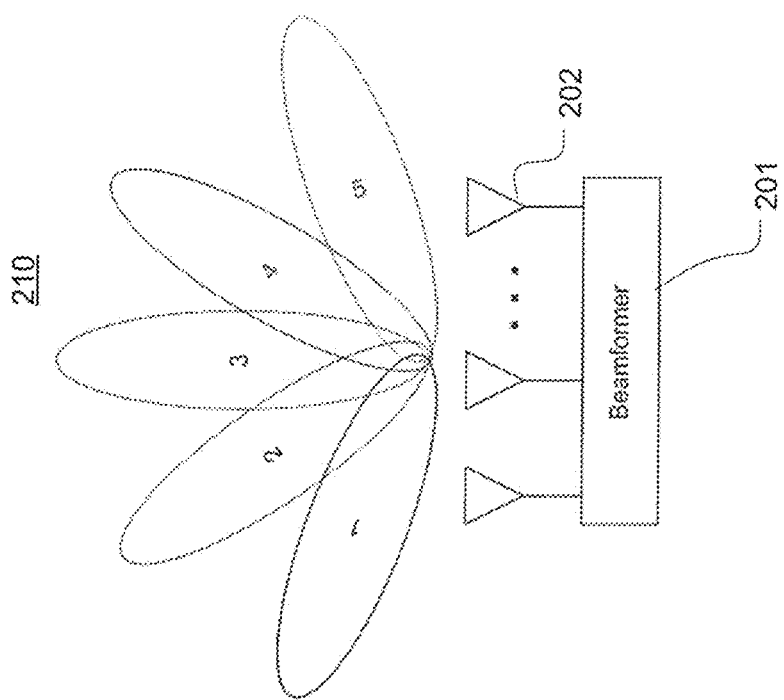

FIG. 2 illustrates the change in beamforming direction as a result of rotation of the antenna array in an exemplary transmit device in accordance with an embodiment of the present disclosure. As noted above, calibration is performed on the antenna array such that each beam in the beambook has a fixed direction relative to the body frame of the transmit device. Given a beamforming direction, the beamformer 201 sets the phases or beam directions of the antennas according to a beamforming vector. The beamforming direction is dependent on the rotational position of the transmit device as well as the relative locations between the two devices.

For instance, in diagram 210, the receive device (not shown) is located in a distance along the direction of beam 3 transmit direction. For this beamforming direction, the 5 beams (or signals waves) emitting from the antenna array 202 are set to respective transmit directions and phases, and the superposition of the beams results in the beamforming direction that points to the receive device. Particularly, for example, beam 3 is perpendicular to the plane of the antenna array and beam 2 points to 120 degrees from the plane.

Diagram 220 shows that the receive device moves from upright to the right (or from north to east), and the transmit device is correspondingly rotated such that the receive device is still located along the direction of beam 3 transmit direction. That is, the antenna array position relative to the receive device is unchanged. Thus, the same beam vector as used in the situation of diagram can be used. As described above, the beamform vector incorporates the random error compensation as a result of the calibration process.

In the embodiments described in detail herein, the receive device rotational position is not factored in determining the beamforming direction. However, the present disclosure is not limited thereto. In some other embodiments, the receive device rotation position is also incorporated to determine a transmit beamforming direction.

Figure 3:
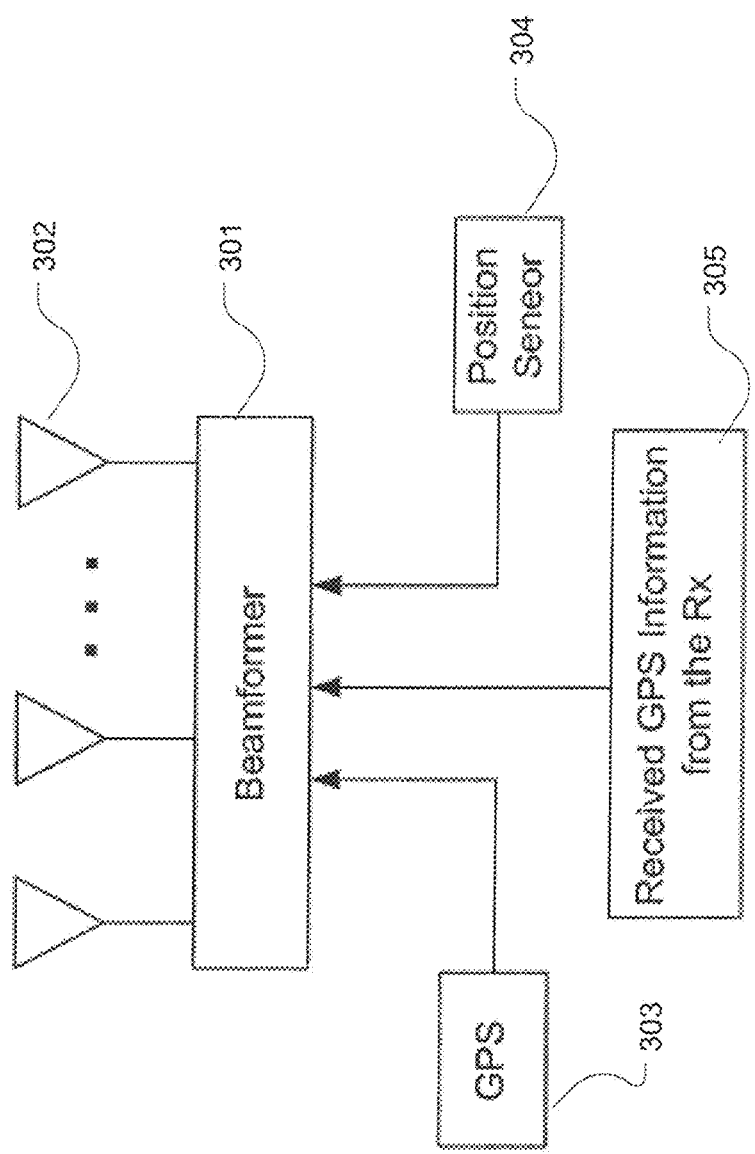
FIG. 3 illustrates the pertinent information and components in an exemplary transmit used for geolocation-based beamforming in a UAV operation and control system in accordance with an embodiment of the present disclosure.

FIG. 3 illustrates the pertinent information and component in an exemplary transmit configured for geolocation-based beamforming in a UAV operation and control system in accordance with an embodiment of the present disclosure. To determine a beamforming direction, the beamformer 301 utilizes the GPS information of the transmit and receive devices and the rotational position of the antenna array 302 of the transmit devices. The transmit device has a built-in GPS receiver 303 that can generate current geolocation information of itself. It also has one or more rotational sensors 304 that can generate rotational position of the antenna array 301, e.g., a roll angle, a yaw angle and/or a tilt angle. The transmitter may extract the geolocation, e.g., represented in the form of $P_{tx}(x,y,z)$. The positon of the antenna array may be represented as a rotation angle of the array $\theta_{an}$ from a reference orientation, which is also the rotation angle of the UAV in the case that the transmit device is the UAV. For example, the reference direction is oriented east.

In addition, the current geolocation 305 of the receive device is transmitted to the transmit device and supplied to the beamformer, e.g., from the GPS in the receive device. The transmitter may extract the geolocation, e.g., represented in the form of $P_{rx}(x,y,z)$. The beamformer then processes the GPS information of both devices and the rotational position information of the transmit device to determine a beamforming direction.

Figure 4:
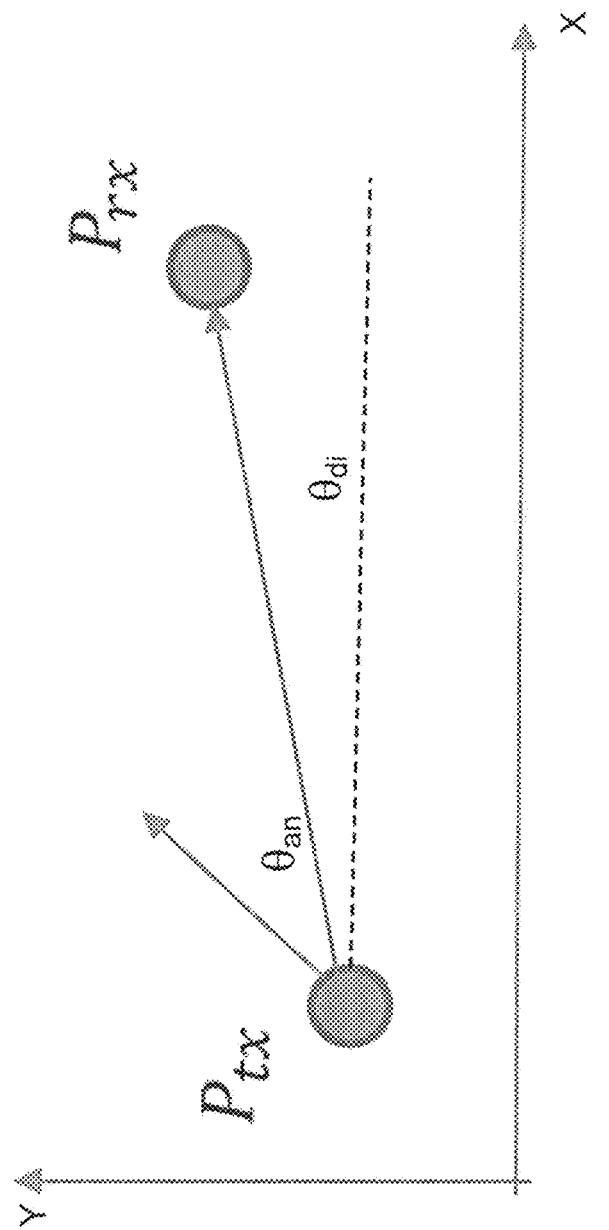
FIG. 4 illustrates the relation of the geolocations of the devices with a desired beamforming direction that is used in an exemplary two-dimensional beamforming process according to an embodiment of the present disclosure.

FIG. 4 illustrates the relation of device geolocations with a desired beamforming direction that is used in an exemplary two-dimensional beamforming process according to an embodiment of the present disclosure. In this example, the transmit device and receive device are located on a same or similar altitude. Their height difference can be ignored for purposes of beamforming. The beamforming can be performed two-dimensionally. Given their geolocations $P_{tx}(x,y,z)$ and of $P_{rx}(x,y,z)$ and the rotation angle of the antenna array $\theta_{an}$, the spatial direction between the two devices can be calculated and represented as $\theta_{di}$ from the reference orientation, e.g., the east (along the x axis as shown). The beamforming direction can be calculated as $$\theta_{bf} = \theta_{an} - \theta_{di} \qquad \text{(Equation 1)}$$

In some embodiments, all angles used are in the range of $[-\pi,\pi]$ and relative to the reference orientation. Based on $\theta_{bf}$, a calibrated beamforming vector corresponding to the $\theta_{bf}$ is selected. The beamforming vector includes a set of phases and amplitudes of the antennas in the antenna array to achieve the beamforming direction. For example, each beam factor composed of at least one of the beam index, switch information for the beam index, and phase information.

Figure 5:
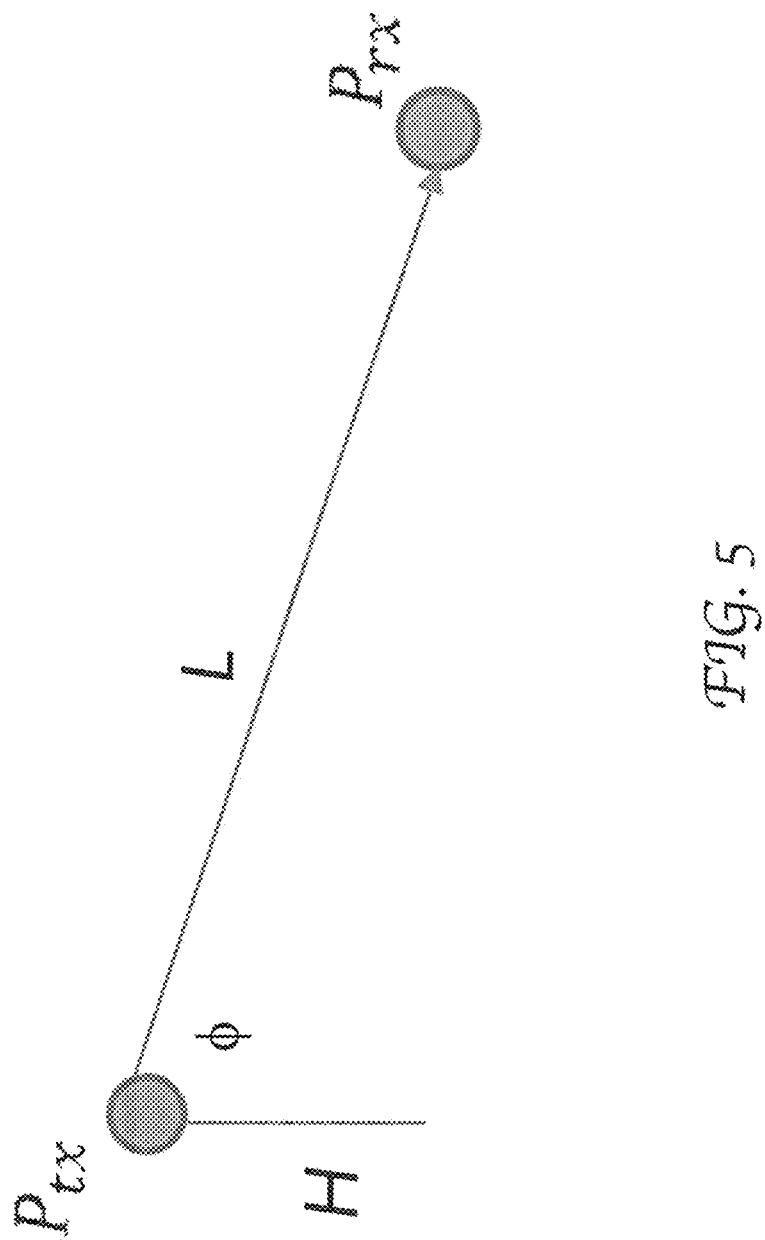
FIG. 5 illustrates the relation of the geolocations of the devices with a desired beamforming direction that is used in an exemplary three-dimensional beamforming process according to an embodiment of the present disclosure.

In some other example, the beambook is three-dimensional, and the altitude difference between the transmit device and the receive device is taken into account. FIG. 5 illustrates the relation of the device geolocations with a desired beamforming direction that is used in an exemplary three-dimensional beamforming process according to an embodiment of the present disclosure. As shown, the spatial direction between the transmit device and the receive devices implies a height difference. The angle of inclination φ can be calculated based on $P_{tx}(x,y,z)$ and $P_{rx}(x,y,z)$. In some embodiments, the angle may be approximated by using the distance L and height H, represented as $$\varphi \cong H/L \quad \text{(Equation 2)}$$

A beamforming vector is then selected from the calibrated beambook that is closest to the angles ($\theta_{bf}$, φ).

However, it will be appreciated that various mathematical relations, algorithms or computation process can be used in determining a beamforming direction based on geolocation information and antenna rotational position information without departing from the scope of the present disclosure. Further, it will be appreciated that geolocation-based beamforming at the receive device can be achieved in the similar manner as described above with reference to the transmit device beamforming.

Figure 6:
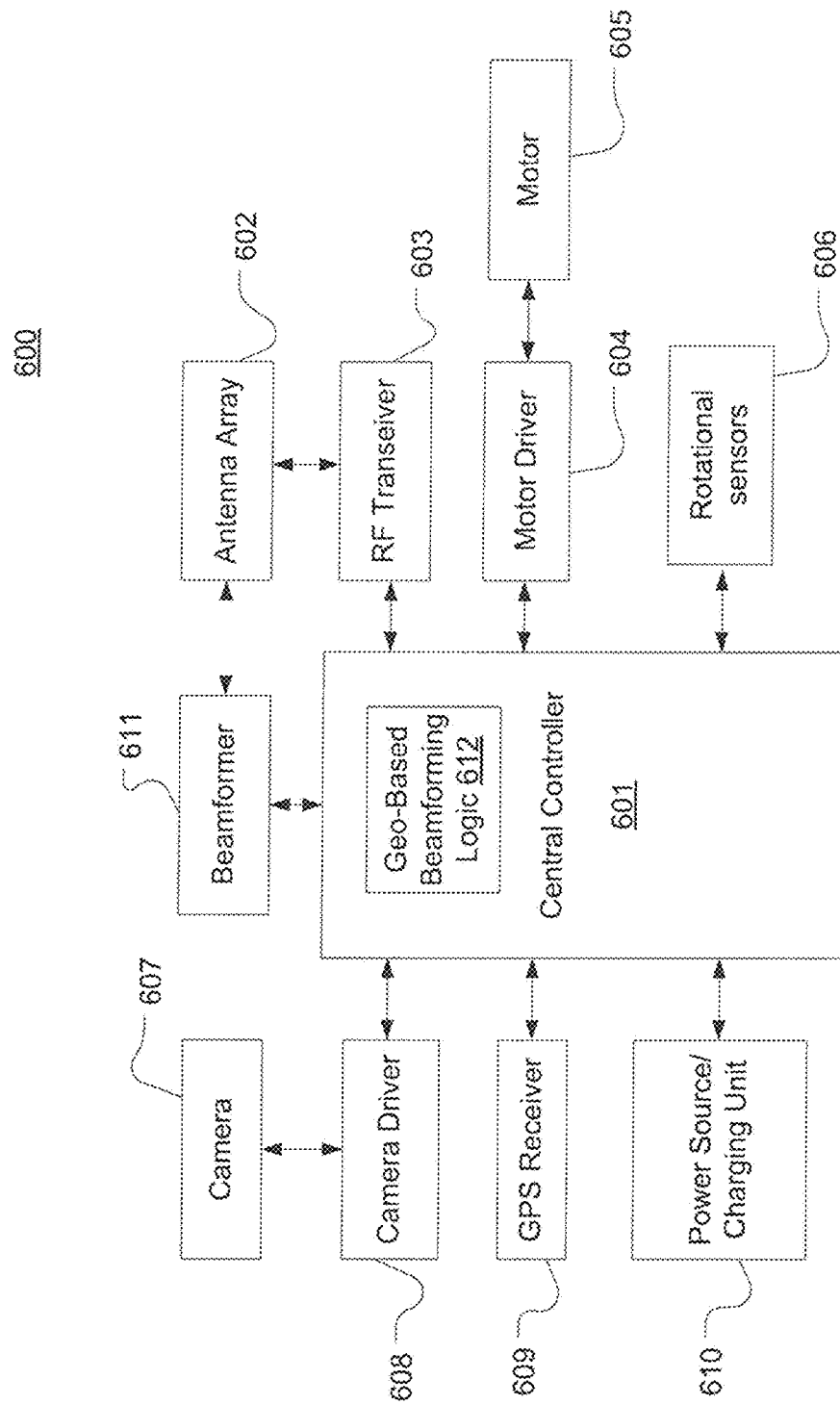
FIG. 6 illustrates the component of an exemplary UAV device capable of beamforming based on geolocations of itself and its remote control STA in accordance with an embodiment of the present disclosure.

FIG. 6 illustrates the component of an exemplary UAV device 600 capable of beamforming based on geolocations of itself and its remote control STA in accordance with an embodiment of the present disclosure. The UAV may be configured to be controlled, operated or piloted in real time by a human operator via a ground-based control system, e.g., a remote control console. In some other embodiments, the UAV can be supervised, but is not piloted, in real time by a human operator via a ground-based monitoring system. In still some other embodiments, the UAV is capable of autonomous control in flight and includes navigational instrumentation and control circuitry that permit the UAV to navigate in real time without the aid of a human operator.

The UAV may be designed for various applications. For example, the UAV is used for target and decoy applications and provides ground and aerial gunnery a target that simulates an enemy aircraft or missile. It may be used to provide battlefield intelligence, and attack capability for high-risk missions, deliver cargo. It may be used in agriculture, aerial photography, data collection tasks.

The UAV 600 includes a central controller 601 communicatively coupled to various other components, including an RF transceiver 603, a motor driver 604 coupled to one or more motors 605, a set of rotational sensors 606, a camera driver 608, a GPS receiver 609, a power source/charging unit 610 and a beamformer 611. The UAV 600 includes a range of other hardware and software components that are well known in the art.

The UAV 600 is equipped with a camera 607 that can capture images and/or videos during flight and transmit the image or video data to the remote control console through a wireless communication channel, e.g., in real time. Any suitable wireless communication mechanisms or protocols can be used for the wireless communication between the UAV and the remote control STA. The central controller includes geolocation-based beamforming logic 612 configured to process GPS information of the UAV and the remote control STA and the rotational position information of the UAV, thereby determining a beamforming direction. Once the beamforming direction is determined, video/image data can be transmitted through the antennas by using beamforming as described in greater detail with reference to FIGS. 1~5. The geolocation-based beamforming logic 612 can be implemented by using hardware logic, software logic, or a combination thereof.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A method of wireless communication between an unmanned aerial vehicle (UAV) and a control station (STA), said method comprising:
   accessing first geolocation information and rotational position information of a transmit device;
   at said transmit device, receiving second geolocation information of a receive device transmitted from a first wireless communication channel;
   at said transmit device, determining a beamforming direction based on said first geolocation information and said second geolocation information and further based on said rotational position information of said transmit device; and
   transmitting a message from said transmit device to said receive device via said first wireless communication channel by beamforming on an antenna array of said transmit device in said beamforming direction,
   wherein said transmit device is one of of said UAV and said control STA, and wherein further said receive device is one of said control STA and said UAV.

2. The method of claim 1 further comprising, at said transmit device, calibrating said antenna array of said transmit device to compensate phase offsets of said antenna array prior to said determining said beamforming direction.

3. The method of claim 1, wherein said determining said beamforming direction comprises:
   determining a spatial direction defined by said first geolocation information and said second geolocation information; and
   combining said spatial direction with said rotational position information to determining said beamforming direction.

4. The method of claim 2, wherein said calibrating is performed in response to a power-on event of said transmit device.

5. The method of claim 1 further comprising receiving said first geolocation information from another wireless station that is different than said receive device.

6. The method of claim 5, wherein said first geolocation information and said second geolocation information are Global Positioning System (GPS) information.

7. The method of claim 1, wherein said rotational position information of said transmit device corresponds to a rotational position of said antenna array, wherein said antenna array remains stationary relative to said transmit device during operations of said transmit device.

8. The method of claim 1 further comprising calibrating said antenna array of said transmit device to generate a set of beamforming vectors, wherein each beamforming vector corresponds to a rotational position of said transmit device, and wherein further said beamforming on said antenna array comprises selecting a beamforming vector from said set of beamforming vectors.

9. The method of claim 8, wherein said antenna array comprises antennas physically arranged in two dimensions.

10. The method of claim 7, wherein said rotational position of said antenna array is defined by a combination of pitch, roll and yaw rotations of said transmit device, and wherein further said rotational position information of said transmit device is generated by a set of rotation sensors in said transmit device.

11. A transmit device for unmanned aerial vehicle (UAV) operations, said device comprises:
- a processor;
- a memory coupled to said processor;
- a transceiver coupled to an antenna array;
- a beamformer coupled to said transceiver;
- a Global Positioning System (GPS); and
- a set of rotation sensors operable to sense rotational positions of said transmit device, wherein said memory comprise instructions that, when executed by said processor, cause said transmit device to perform a method of wireless communication between a UAV and a control station (STA), said method comprising:
- accessing first geolocation information and rotational position information of said transmit device, wherein said first geolocation information is produced by said GPS and wherein said rotational position information is produced by said rotational sensors;
- receiving second geolocation information of a receive device transmitted from a first wireless communication channel;
- determining a beamforming direction based on said first geolocation information and said second geolocation information and further based on said rotational position information of said transmit device; and
- transmitting a message from by using said transceiver to said receive device via said first wireless communication channel by beamforming on said antenna array of said transmit device in said beamforming direction,
- wherein said transmit device is one of said UAV and said control STA, and wherein further said receive device is one of said control STA and said UAV.

12. The transmit device of claim 11, wherein said method further comprises calibrating said antenna array of said transmit device to compensate phase offsets of said antenna array prior to said determining said beamforming direction.

13. The transmit device of claim 11, wherein said determining said beamforming direction comprises:
- determining a spatial direction defined by said first geolocation information and said second geolocation information; and
- combining said spatial direction with said rotational position information to determining said beamforming direction.

14. The transmit device of claim 11, wherein said calibrating is performed in response to a power-on event of said transmit device.

15. The transmit device of claim 11, wherein said method further comprises receiving said first geolocation information from another wireless station that is different than said receive device.

16. The transmit device of claim 11, wherein said rotational position information of said transmit device corresponds to a rotational position of said antenna array, wherein said antenna array remains stationary relative to said transmit device during operations of said transmit device.

17. The transmit device of claim 11, wherein said method further comprises calibrating said antenna array of said transmit device to generate a set of beamforming vectors, wherein each beamforming vector corresponds to a rotational position of said transmit device.

18. The transmit device of claim 17, wherein said beamforming on said antenna array comprises selecting a beamforming vector from said set of beamforming vectors.

19. The transmit device of claim 18, wherein said antenna array comprises antennas physically arranged in two dimensions.

20. The transmit device of claim 17, wherein said rotational position of said antenna array is defined by a combination of pitch, roll and yaw rotations of said transmit device, and wherein further said rotational position information of said transmit device is provided by said set of rotation sensors.

* * * * *